United States Patent
Matsumoto

(10) Patent No.: US 8,476,862 B2
(45) Date of Patent: Jul. 2, 2013

(54) POWER SUPPLY CONTROLLER

(75) Inventor: Tadaichi Matsumoto, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 488 days.

(21) Appl. No.: 12/933,267

(22) PCT Filed: Mar. 4, 2009

(86) PCT No.: PCT/JP2009/054035
§ 371 (c)(1),
(2), (4) Date: Sep. 17, 2010

(87) PCT Pub. No.: WO2009/116392
PCT Pub. Date: Sep. 24, 2009

(65) Prior Publication Data
US 2011/0026172 A1 Feb. 3, 2011

(30) Foreign Application Priority Data
Mar. 21, 2008 (JP) ................................ 2008-073493

(51) Int. Cl.
*H02P 27/04* (2006.01)
(52) U.S. Cl.
USPC ............ 318/800; 318/801; 417/18; 417/44.1; 417/45; 363/40; 363/55; 180/65.1; 180/65.21
(58) Field of Classification Search
USPC .... 318/139, 434, 727, 799, 801, 812; 417/18, 417/44.1, 45; 429/15, 535; 363/40, 55, 102; 180/65.1, 65.21, 65.225, 65.275; 320/101; 322/16; 123/339.1; 903/968, 944
See application file for complete search history.

(56) References Cited

U.S. PATENT DOCUMENTS
7,279,242 B2 * 10/2007 Sugawara et al. ............. 429/415
7,967,572 B2 * 6/2011 Ishikawa et al. ................ 417/18

FOREIGN PATENT DOCUMENTS
| JP | 2002-218607 A | 8/2002 |
| JP | 2003-187816 A | 7/2003 |
| JP | 2006-164555 A | 6/2006 |
| JP | 2007-124746 A | 5/2007 |
| JP | 2007-259631 A | 10/2007 |

* cited by examiner

*Primary Examiner* — Antony M Paul
(74) *Attorney, Agent, or Firm* — Kenyon & Kenyon LLP

(57) ABSTRACT

In a system comprising a fuel and a rotating electrical machine, damage of a switching element is prevented when the rotating electrical machine becomes a locked state. In a power controller, it is monitored whether the rotating electrical machine is in the locked state or not. When the rotating electrical machines is judged to be in the locked state, a command for dropping output voltage is given to the fuel cell. Thus, inverter input voltage can be dropped, loss power of the switching element in the rotating electrical machine is dropped and damage can be suppressed. The rotating electrical machine is monitored to cancel the locked state or not while dropping of inverter input voltage is controlled. When the locked state is judged to be canceled, control of the fuel cell is returned to a state of regular operation control.

5 Claims, 6 Drawing Sheets

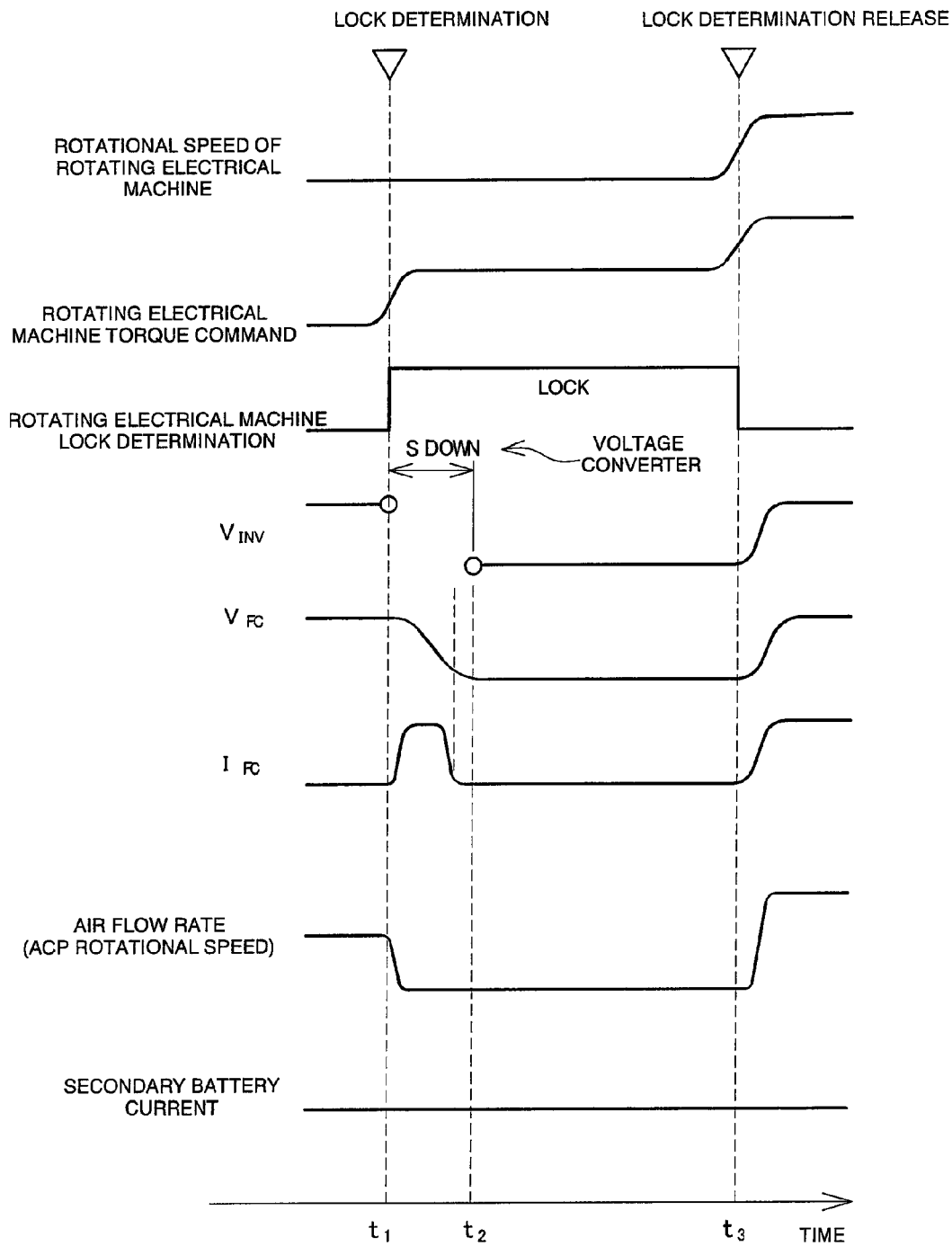

POWER SUPPLY CONTROLLER

This is a 371 national phase application of PCT/JP2009/054035 filed 4 Mar. 2009, claiming priority to Japanese Patent Application No. JP 2008-073493 filed 21 Mar. 2008, the contents of which are incorporated herein by reference.

TECHNICAL FIELD

The present invention relates to a power supply controller, and in particular relates to a power supply controller for carrying our power supply operation control when a rotating electrical machine enters a locked state.

BACKGROUND ART

With a rotating electrical machine there is a possibility of a locked state arising where rotation stops, due to equilibrium between the output and load of the machine. For example, in a controller for a rotating electrical machine for driving a vehicle, when there is a balance between retreating of a vehicle that is on an uphill path due to the vehicle weight, and forward motion due to motor torque, the rotating electrical machine may become locked or stalled. When the rotating electrical machine is of a multiphase drive type, if it enters a locked state, since the operating state of the multiphase coils is fixed, for example, if one of the multiphase coils is at maximum current in the locked state that maximum current state will continue. Therefore, depending on the situation, there is a possibility of a coil in which that maximum current flows, and switching elements connected to that coil, being damaged.

For example, in patent document 1 it is described that with a motor drive unit, if the boosting ratio of a boosting converter remains large when the motor is locked, switch elements of an inverter will be damaged because of current crowding, while on the other hand if the boosting ratio is uniformly lowered there is motor torque instability, and it is necessary to take these two scenarios into consideration. Here, the boosting ratio of the boosting converter is set to an operating point at which it is possible to keep torque equal and make motor drive voltage lower.

Also, in connection with the structure of the present invention, in patent document 2 it is disclosed that an electric vehicle comprises a power supply unit, high voltage auxiliary equipment as a load to which electrical power is supplied from the power supply unit, and an electric motor connected to the power supply unit via a drive inverter, having wiring provided between the power supply unit and the load, wherein power is exchanged between the power supply unit and the load via this wiring. Here, it is described that the power supply unit has a fuel cell, capacitor, a secondary battery and a DC/DC converter respectively connected to the wiring, and a switch for switching connection states of the fuel cell is provided in the wiring.

Patent document 1: JP 2007-124746
Patent document 2: JP 2003-187816

In patent document 1 boosting control when a rotating electrical machine enters a locked state is described, and in patent document 2 a power supply unit including a fuel cell is described. The documents describe respectively separate related art technology, but there is no description of control of a power supply unit that includes a fuel cell, in a system including a fuel cell and a rotating electrical machine, capable of preventing damage to switching elements when the rotating electrical machine enters a locked state.

An object of the present invention is to provide a power supply controller, in a system including a fuel cell and an electrical rotating machine, capable of preventing damage to switching elements when the rotating electrical machine enters a locked state.

SUMMARY OF THE INVENTION

A power supply controller of the present invention comprises an inverter connected to a rotating electrical machine, a fuel cell connected in parallel with a pair of power lines, the pair of power lines being a positive side bus bar and a negative side bus bar of the inverter, a secondary battery connected in parallel with the pair of power lines, a voltage converter, connected in parallel with the pair of power lines, and connected between the fuel cell and the secondary battery, and a control section, the control section including a locked state acquisition part that acquires whether or not the rotating electrical machine is in a locked state, and a fuel cell control part that, when the rotating electrical machine is in a locked state, changes an output voltage of the fuel cell so as to become a predetermined specified low voltage from a normal control voltage condition when the rotating electrical machine is not locked.

Also, in the power supply controller of the present invention, with respect to supply of at least one of oxidation gas or fuel gas to the fuel cell, it is possible for the fuel cell control part, when the rotating electrical machine is in a locked state, to change from a normal supply state when the rotating electrical machine is not in a locked state to a limited supply state where supply amount is limited.

Also, with the power supply controller of the present invention, it is possible to provide relay members, in the pair of power lines at an output side of the fuel cell, for connecting or disconnecting between the fuel cell and the inverter, and between the fuel cell and the voltage converter, and for the control section, to include a voltage conversion control part that, when the rotating electrical machine is in a locked state, changes from a normal control voltage state when the rotating electrical machine is not locked to a specified low voltage state in which the inverter input voltage, which is a voltage across the pair of power lines, is lowered to a predetermined low voltage, using operation control of the voltage converter, and a relay state changing part that, when the rotating electrical machine has gone from a state where it is not locked to a locked state, changes the relay members from a connected state to a disconnected state, so that emission current due to a capacitive component of the fuel cell does not arise, even if the inverter input voltage is lowered.

It is also possible, with the power supply controller of the present invention, for the relay state changing part to return from a state where the rotating electrical machine is in a locked state to an unlocked state, and further return the fuel cell to a normal supply state, and in this way return the relay members to a connected state when an open output voltage of the fuel cell becomes a predetermined specified open output voltage.

Also, with the power supply controller of the present invention, it is possible for the control section to have a voltage converter control part that, when the rotating electrical machine is in a locked state, stops operation of the voltage converter in a lowering period where output voltage of the fuel cell is lowered to a specified low voltage level by limiting supply of at least one of oxidation gas and fuel gas to the fuel cell, absorbing emission current due to a capacitive component of the fuel cell that arises in accordance with lowering of the inverter input voltage in response to lowering of the output voltage of the fuel cell, using the inverter, and releasing the stopping of the voltage converter once the lowering period has elapsed.

Also, with the power supply controller of the present invention, it is possible for the rotating electrical machine to be a rotating electrical machine for driving a vehicle, mounted in the vehicle.

With the above-described structure, a power supply controller comprises an inverter, a fuel cell; a secondary battery, a voltage converter and a control section. When the rotating electrical machine is in a locked state, the control section changes the output voltage of the fuel cell so as to become a predetermined specified low voltage from a normal control voltage state when the rotating electrical machine is not in a locked state. The inverter input voltage is lowered by lowering the output voltage of the fuel cell, and power loss in switching elements of the rotating electrical machine in the locked state is reduced. In this manner, it is possible to prevent damage to switching elements of the rotating electrical machine that is in a locked state using operation control of the fuel cell.

Also, with the power controller, when the rotating electrical machine is in a locked state, with respect to supply of at least one of oxidation gas or fuel gas to the fuel cell, supply amount is limited from a normal supply state where the rotating electrical machine is not in a locked state. In this way, so-called low-efficiency power generation is carried out, and it is possible to lower output voltage with output current kept as it is. It is therefore possible to reduce power loss of switching elements while inhibiting lowering of torque of the rotating electrical machine, even if the rotating electrical machine is in a locked state.

Also, the power supply controller is provided with relay members that connect or disconnect between the fuel cell and the inverter, and between the fuel cell and the voltage converter, and when the rotating electrical machine goes from a state where it is not in a locked state to a locked state the relay members change from a connected state to a disconnected state. At this time, the inverter input voltage is changed from a normal control voltage state, when the rotating electrical machine is not in a locked state, to a specified low voltage state lowered to a predetermined low voltage. In this way, when the rotating electrical machine is in a locked state, the inverter input voltage is lowered, and power loss in switching elements of the rotating electrical machine in the locked state is reduced. Also, if the relay members are in a connected state the fuel cell is operated as a capacitor by lowering the inverter input voltage, and discharge of current may arise such that lowering of the inverter input voltage is compensated, thus inhibiting lowering of the inverter input voltage, but by disconnecting the relay members it is possible to stop the effects of emission current arising.

Also, with the power supply controller, the relay state changing part returns from a state where the rotating electrical machine is in a locked state to a unlocked state, and further the fuel cell returns to a normal supply state, and in this way the relay members returns to a connected state when an open output voltage of the fuel cell becomes a predetermined specified open output voltage. It is therefore possible to efficiently carry out normal control of the fuel cell.

Also, with the power supply controller, the control section, when the rotating electrical machine is in a locked state, stops operation of the voltage converter in a lowering period where output voltage of the fuel cell is lowered to a specified low voltage level by limiting supply of at least one of oxidation gas and fuel gas to the fuel cell, makes the inverter absorb emission current due to a capacitive component of the fuel cell that arises in accordance with lowering of the inverter input voltage in response to lowering of the output voltage of the fuel cell, and releases the stopping of the voltage converter once the lowering period has elapsed. In this way, emission current of the fuel cell is absorbed by the inverter that is in a locked state, even if current is emitted from the fuel cell so as to compensate for the lowering of the inverter input voltage due to the fuel cell operating as a capacitor. At this time, the output voltage of the fuel cell is lowered, and so after absorbing the emission current operation of the voltage converter is restarted, and control is carried out to supply that lowered output voltage to the inverter. In this manner, it is possible reduce power loss in the switching elements of the inverter when the rotating electric machine is in the locked state, while reducing the effect of discharged current, and to inhibit damage to the switching elements of the inverter.

Also with the power supply controller, the rotating electrical machine is a rotating electrical machine for driving a vehicle and is mounted in the vehicle, and so it is possible to restrict damage to switching elements of the inverter even when the rotating electrical machine becomes to a locked state, such as when the vehicle to which the rotating electrical machine is mounted is traveling on a hill.

BRIEF DESCRIPTION OF THE DRAWINGS

FIG. 7 is a timing chart showing yet another example of control in the embodiment of the present invention.

DESCRIPTION OF REFERENCE NUMERALS

8 Rotating electrical machine, 10 Fuel cell, 12 Secondary battery, 16 Fuel cell-side relay, 18 Secondary battery-side relay, 20 Inverter, 22 Fuel cell stack, 26 Fuel gas tank, 28 diluter, 30 Coolant circulation pump, 40 Oxidation gas source, 45 Regulator valve, 46 Regulator, 47 Flow divider, 48 Exhaust valve, 49 Circulation booster, 50 Control section, 52 Locked state acquisition module, 54 Fuel cell control module, 56 Voltage converter control module, 58 Relay state changing module, and 60, 62 Characteristic line.

DESCRIPTION OF EMBODIMENTS

Embodiments of the present invention will now be described in detail below using the drawings. In the following, description is given with the rotating electrical machine being mounted in a vehicle, but it is also possible to be a rotating electrical machine used in an application besides a vehicle, such as a static type rotating electrical machine. Also, description is given of a single rotating electrical machine as a vehicle fitted with a fuel cell, but it is also possible for the vehicle to have a plurality of rotating electrical machines.

Also, description is given with the rotating electrical machine being a motor/generator having a function as a motor and a function as a generator, but it is also possible for the vehicle to have the rotating electrical machine having only a motor function or to have the motor and generator separately.

Also, in the following, description has been given of a structure having a power supply circuit comprising a high voltage electricity storage device, a fuel cell, a voltage converter and a high voltage operation inverter, but it is also possible to have elements other than these. For example, it is possible to include components such as a smoothing condenser, low voltage battery, low voltage operation DC/DC converter etc. Also, values such as respective power values used in the following are one example for explanation, and obviously it is also possible to have values other than these.

Figure 1:
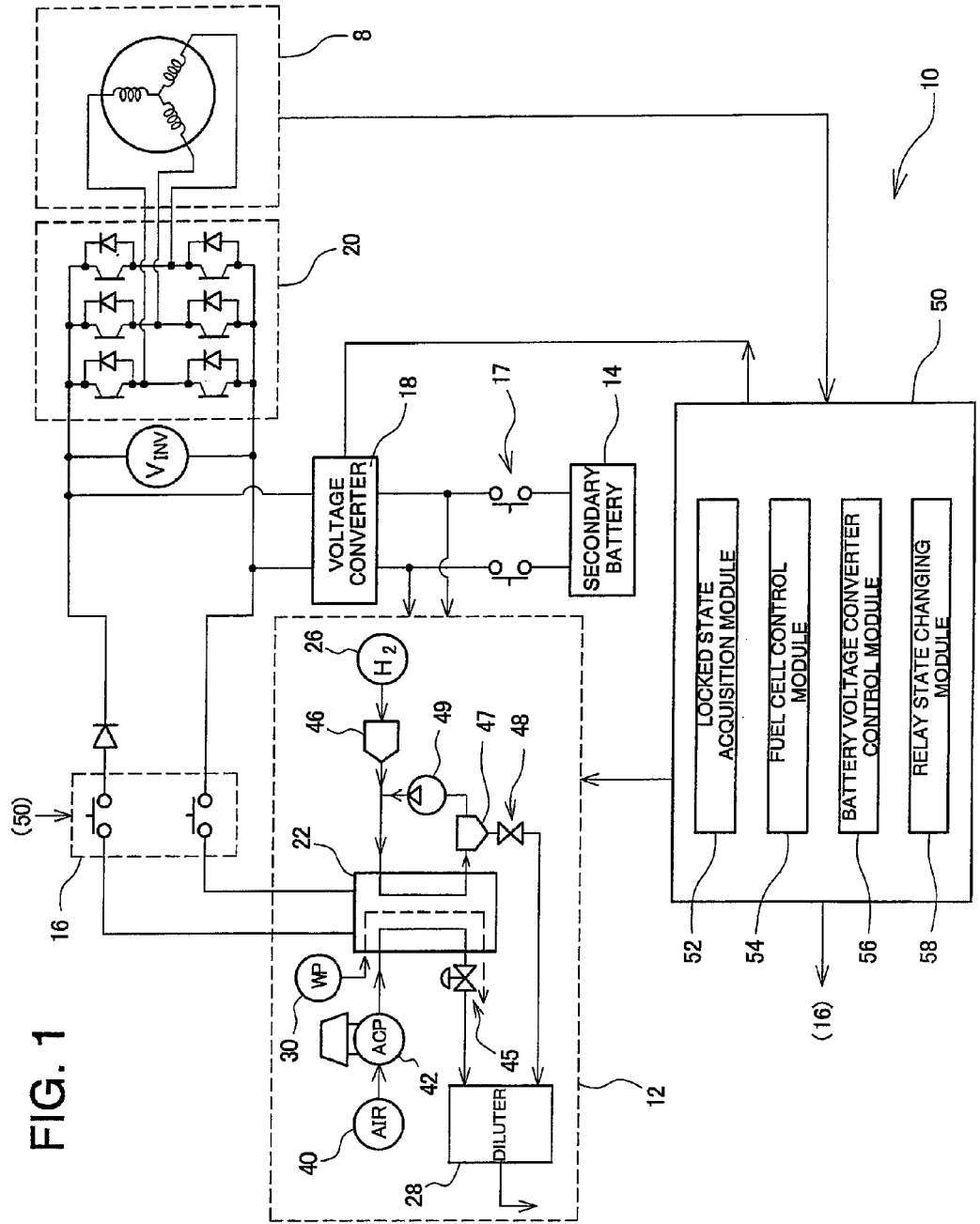
FIG. 1 is a drawing showing the structure of a power supply controller of an embodiment of the present invention

FIG. 1 is a drawing showing the structure of a power supply controller 10 of a vehicle fitted with a fuel cell provided with rotating electrical machine. This power supply controller 10 is constructed comprising a fuel cell 12, a high voltage secondary battery 14, a fuel cell-side relay 16, a secondary battery-side relay 17, a voltage converter 18, a high voltage operation inverter 20, and a control section 50.

Although not a structural element of the power supply controller 10, a rotating electrical machine 8 is shown in the drawing. Here, the rotating electrical machine 8 is a motor/generator (M/G) mounted in a vehicle, and is a three phase synchronous rotating electrical machine that functions as a motor when power is supplied, and functions as a generator when braking. Rotational speed of the rotating electrical machine 8 is detected by a suitable detection means, this detected value is sent to the control section 50, and in particular, here is used in determining a locked state of the rotating electrical machine 8.

Here, description will first be given of components other than the fuel cell 12, and after that the structure of the fuel cell 12 will be described.

The secondary battery 14 is a chargeable high voltage electricity storage device, for transferring power with the fuel cell 12 via the voltage converter 18, and has a function of handling fluctuations in load, such as the rotating electrical machine 8 and various auxiliary devices for the fuel cell that will be described later. As the secondary battery 14 it is possible to use a lithium ion battery or a nickel hydride battery having a terminal voltage of, for example, 200V to 300V, or a capacitor.

The fuel cell-side relay 16 and the secondary battery-side relay 17 constitute a high voltage breaker, that is relay members, having a function of carrying out supply or disconnection of high voltage power to the voltage converter 18 and the inverter 20, as required. These operations are controlled by the control section 50.

The voltage converter 18 is a circuit having a function of transferring power according to a potential difference between the high voltage at the secondary battery 14 side and a high voltage at the fuel cell 12 side. For example, when power is supplied to the inverter 20 and rotating electrical machine 8 side, high voltage power is supplied from the secondary battery 14 side to the fuel cell 12 side, and conversely when charging the secondary battery 14 high voltage power is supplied from the fuel cell 12 side to the secondary battery 14 side. It is possible to use an interactive converter including a reactor as the voltage converter 18. Operation of the voltage converter 18 can be controlled by the control section 50.

The inverter 20 is a circuit having a function of converting high voltage DC power to three-phase AC drive power under the control of the control section 50 and supplying to the rotating electrical machine 8, and a function of conversely converting three-phase generated power from the rotating electrical machine 8 to high voltage DC power. As shown in FIG. 1, the inverter 20 can be configured as a circuit having switching elements and diodes, etc. As the switching elements it is possible to use IGBTs (Insulated Gate Bipolar Transistors) etc.

A positive bus bar and a negative bus bar are provided in the inverter as a pair of power lines, and high voltage power is supplied from the fuel cell 12 and the secondary battery 14 to the pair of power lines. A voltage across this pair of power lines is the inverter input voltage, and in FIG. 1 is shown as $V_{INV}$.

When the rotating electrical machine 8 is used for vehicle drive, for example, when there is a balance between backward motion due to the weight of the vehicle and forward motion due to output torque of the rotating electrical machine 8 in a vehicle that is going uphill, there are situations where the rotating electrical machine 8 becomes locked or stalled. When the rotating electrical machine 8 is in a locked state, the operating state of the multi-phase coils of the rotating electrical machine 8 is fixed, and if the maximum current flows in any one of the multiphase coils in the locked state, that maximum current state continues.

As a result, in the inverter 20 also, maximum current flows continuously in switching elements corresponding to that maximum current phase, and left as it is it is likely to lead to damage. In order to prevent this, when the rotating electrical machine 8 is in a locked state processing to lower the inverter input voltage $V_{INV}$ is executed, but detailed content of this processing will be described later.

Next the fuel cell 12 will be described. The fuel cell 12 is constructed comprising a fuel cell body called a fuel cell stack 22 having a plurality of fuel cells stacked together, as well as respective elements for supplying fuel gas arranged at an anode side of the fuel cell stack 22 and respective elements for supplying oxidation gas arranged at the cathode side. A fuel cell is simply called an FC (Fuel cell).

The fuel cell stack 22 has a plurality of unit batteries assembled and stacked together, the unit batteries being sandwiched by separators arranged at both outer sides of an MEA (Membrane Electrode Assembly) in which catalytic electrode layers are arranged on both sides of an electrolytic film. The fuel cell stack 22 has fuel gas such as hydrogen supplied to the anode side, an oxidation gas containing oxygen, such as air for example, supplied to a cathode side, and has a function of generating electricity utilizing a electro chemical reaction via the electrolytic film, and extracting power. The fuel cell stack 22 is sometimes called an FC stack.

A fuel gas tank 26 at the anode side is a hydrogen gas source, and is a tank for supplying hydrogen as the fuel gas. A regulator 46 connected to the fuel gas tank 26 that is a hydrogen gas source has a function of appropriately adjusting pressure and flow rate of gas from the fuel gas tank 26. The outlet of the regulator 46 is connected to an anode side inlet of the fuel cell stack 22, and fuel gas that has been adjusted to an appropriate pressure and flow rate is supplied to the fuel cell stack 22.

A flow divider 47 connected to an anode side of the fuel cell stack 22 is for flow to a diluter 28 via an exhaust valve 48 when the concentration of impurity gas in exhaust gas from the anode side output is high. Also, a circulation booster 49 further provided after the flow divider 47 and between the anode side inlet is a hydrogen pump having a function to increase hydrogen partial pressure of gas returned from the anode side outlet for return and reuse to the anode side inlet.

A cathode side oxidation gas source 40 can actually use air. The air, being an oxidation gas source 40, is supplied through a filter to an air compressor (ACP) 42. The ACP 42 is a gas booster for subjecting the oxidation gas to volume compression using the motor to increase the pressure of the oxidation gas. Also, the ACP 42 has a variable rotational speed (revolutions per minute) and has a function to provide a specified amount of oxidation gas. Specifically, when a required flow rate of oxidation gas is large, the rotational speed of the motor is increased, and conversely when the required flow rate of oxidation gas is small the rotational speed of the motor is reduced. Oxidation gas that has bee pressurized by the ACP 42 is supplied to the fuel cell stack 22 at a desired flow rate by controlling the rotational speed of the ACP 42. Also, a regulator valve 45 provided in the oxidation gas path at an outlet side of the fuel cell stack 22 has a function of adjusting gas pressure at the cathode side outlet.

The diluter 28 is a buffer vessel for collecting hydrogen that contains discharged water from the anode side exhaust valve 48, and exhaust gas that contains moisture and also contains hydrogen that has leaked through the MEA from the cathode side, and discharging to the outside with an appropriate dilution of hydrogen concentration.

Also the coolant circulation pump 30 is a pump for circulating coolant for making the temperature of the fuel cell stack 22 be in an appropriate range for the electrochemical reaction. As coolant it is possible to use cooling water containing an antifreeze such as LLC (Long Life Coolant).

Numerous elements are thus used in the fuel cell 12. Among them are the ACP 42, circulation booster 49 and coolant circulation pump 30 as auxiliary devices that are operated electrically. These auxiliary devices are operated by being supplied with high voltage power from the pair of power lines between the secondary battery 14 and the voltage converter 18.

The control section 50 in FIG. 1 has a function of controlling overall operation of each element constituting the power supply controller 10, and in particular has a function of lowering inverter input voltage $V_{INV}$ when the rotating electrical machine 8 is in a locked state, to thereby limit damage to switching elements etc. of the inverter 20. A rotational speed signal is input to the control section 50 from the rotating electrical machine 8 as information relating to a locked state, and operation of the fuel cell 12, operation of the voltage converter 18 and operation of the fuel cell-side relay 16 are controlled based on the information. It is possible to use a computer appropriate to the vehicle as the control section 50.

The control section 50 includes a locked state acquisition module 52 for acquiring whether or not the rotating electrical machine 8 is in a locked state, a fuel cell control module 54 for changing the fuel cell voltage to a specified low voltage when the rotating electrical machine 8 enters a locked state, a voltage converter control module 56 for controlling operation of the voltage converter 18 when the rotating electrical machine 8 has entered a locked state, and a relay state changing module 58 for changing the fuel cell-side relay 16 from a connected state to a disconnected state.

Relevant functions can be realized by executing software, and specifically, it is possible to execute locked state processing programs within a power controller program. Some of the functions may also be realized using hardware.

Figure 2:
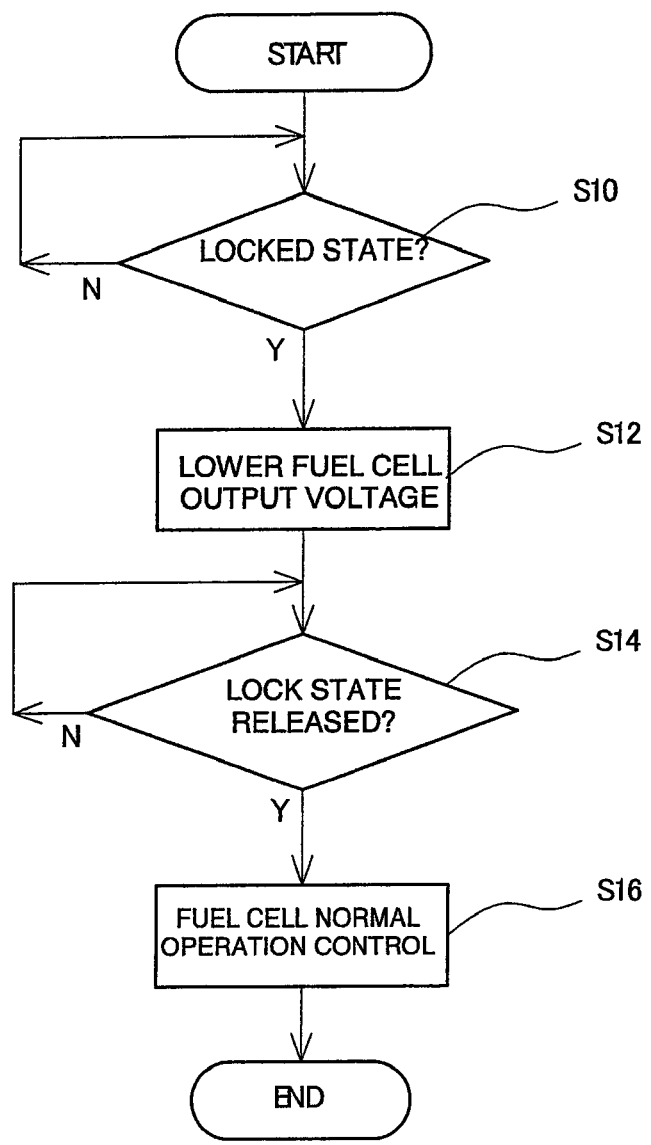
FIG. 2 is a flowchart showing a processing sequence in the embodiment of the present invention when a rotating electrical machine is in a locked state.
Figure 3:
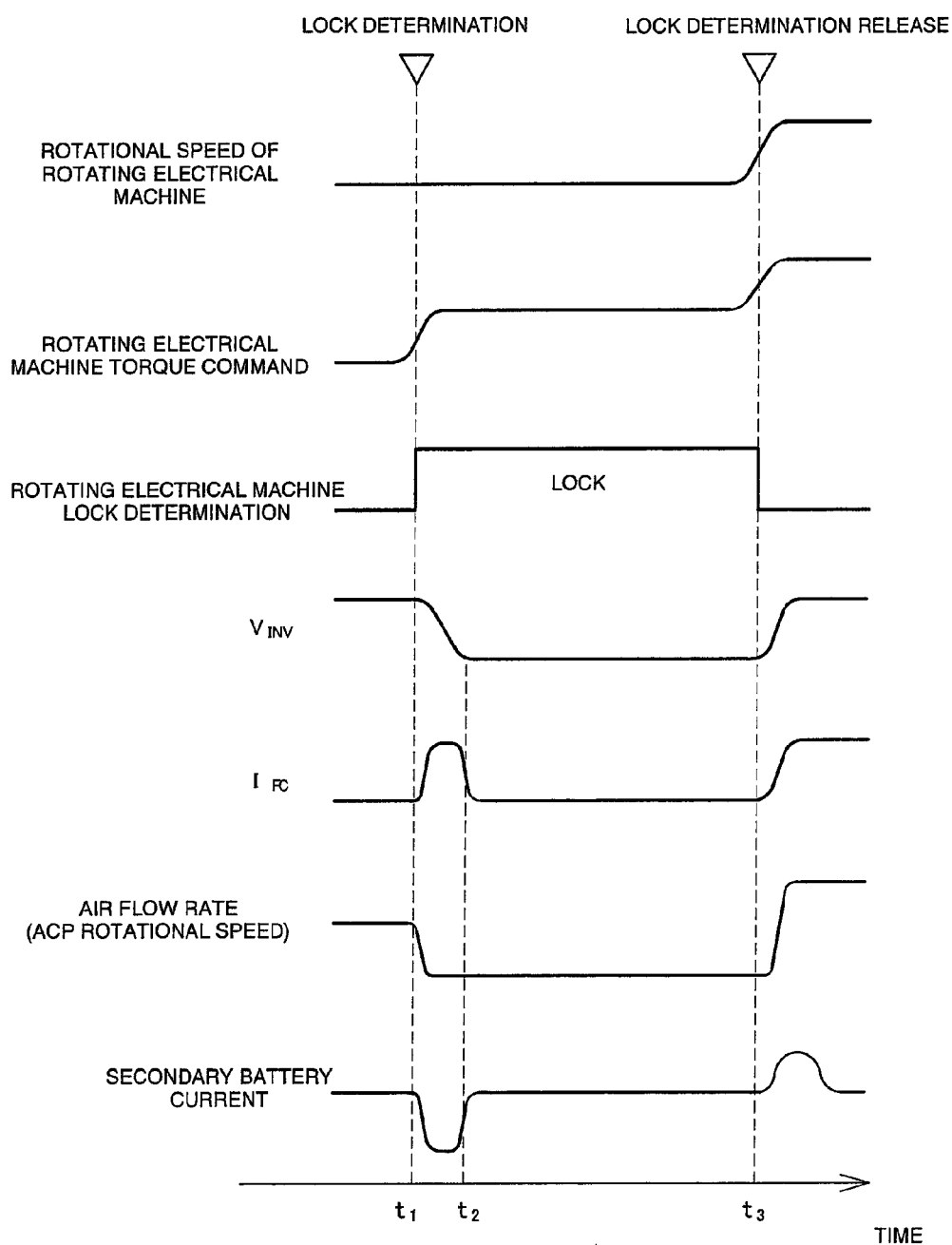
FIG. 3 is a timing chart for explaining time variation of states of each element of the power controller, in the embodiment of the present invention.
Figure 4:
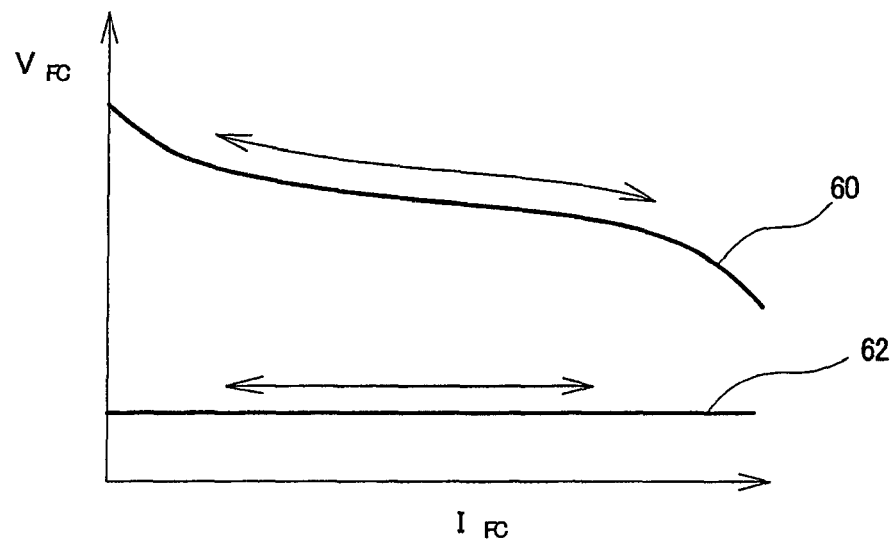
FIG. 4 is a drawing for explaining an aspect of control of a fuel cell in the embodiment of the present invention.
Figure 5:
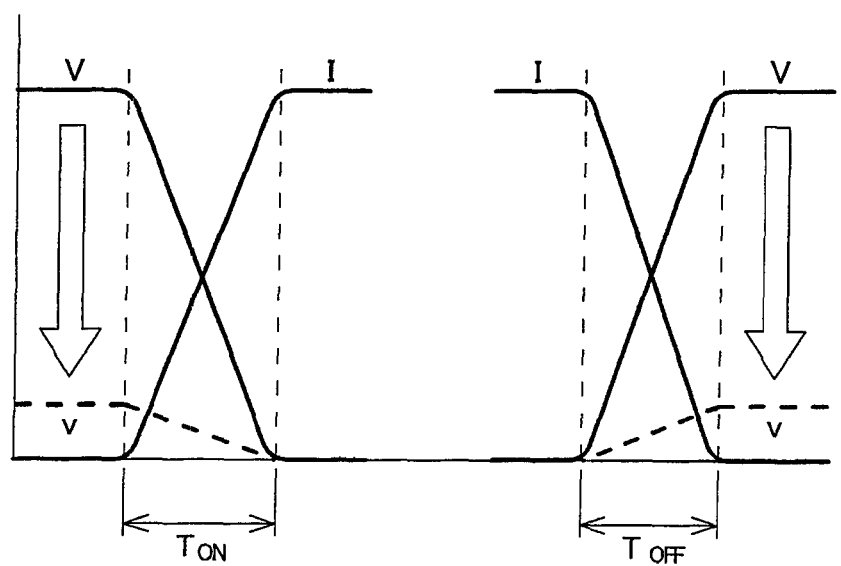
FIG. 5 is a drawing for explaining an aspect of power loss in switching elements of an inverter in the embodiment of the present invention.

Operation of the above described configuration, particularly each function of the control section 50, will now be described using the flowchart of FIG. 2, the timing chart of FIG. 3, and FIG. 4 and FIG. 5. In the following the reference numerals of FIG. 1 will be used. FIG. 2 is a flowchart showing a procedure for processing when the rotating electrical machine 8 is in a locked state, and the content of each procedure respectively corresponds to each processing procedure of a locked state program within a power control program. FIG. 3 is a timing chart for describing change over time of states of each element of the power supply controller 10. Also, FIG. 4 is a drawing for describing an aspect of control of the fuel cell 12, while FIG. 5 is a drawing for describing an aspect of power loss in switching elements of the high voltage operation inverter 20.

In FIG. 2, when a vehicle is running with the rotating electrical machine 8 using the fuel cell 12 and the secondary battery 14, whether or not the rotating electrical machine 8 is in a locked state is monitored (S10). This step is executed using a function of the locked state acquisition module 52 of the control section 50. Whether or not there is a locked state can be judged by determining whether or not the rotational speed of the rotating electrical machine 8 is extremely low or zero compared a value of a torque instruction. For example, in a case where rotational speed of the rotating electrical machine 8 is about 100 rpm or less even though a torque instruction is about 200 Nm or more, it can be determined that the rotating electrical machine 8 is in a locked state. Obviously it is also possible to use different judgment criteria. It is also possible to use a reference other than rotational speed of the rotating electrical machine 8. For example, when there is localization of coil current of the rotating electrical machine 8 to a specific phase, it can be determined that there is a locked state.

The timing chart of FIG. 3 has time on the horizontal axis, and sequentially shows time variation of, from top to bottom in the drawing, rotational speed of the rotating electrical machine, rotating electrical machine torque command, rotating electrical machine lock determination, inverter input voltage $V_{INV}$, fuel cell output current $I_{FC}$, ACP rotational speed representing fuel cell oxidation gas flow rate, and secondary battery current. Here, at time $t_1$, despite a torque command being a desired value, the rotational speed of the rotating electrical machine 8 is not climbing, and so the rotating electrical machine lock determination indicates a locked state.

If it is determined that there is a locked state, a command to reduce output voltage is next output to the fuel cell 12 (S12). This step is executed using a function of the fuel cell control module 54 of the control section 50. Specifically, when the rotating electrical machine 8 is in a locked state the output voltage of the fuel cell 12 is changed from that of a normal control voltage state when the rotating electrical machine 8 is not in a locked state, to a predetermined specified low voltage.

In this case, it is preferable to lower output voltage without varying output current of the fuel cell 12. By performing control in this manner, it is possible to reduce the inverter input voltage $V_{INV}$ while supplying current that matches the torque command. As means of implementing this type of control it is possible to stop supply of oxidation gas, or reduce the supply from the normal amount, to thereby realize a so-called low-efficiency power generation state. It is also possible to stop or reduce the fuel gas, but in this case it is preferable to first stop supply of oxidation gas, and then stop the fuel gas after that, from the point of view of protecting the MEA etc.

This aspect is shown in FIG. 4. FIG. 4 is a drawing for describing operating states of the fuel cell 12 showing the output current of the fuel cell 12 and the output voltage of the fuel cell 12. Normal operation control of the fuel cell 12 is carried out along the characteristic line 60 or best electrochemical reaction efficiency in the fuel cell 12. Specifically, when output current $I_{FC}$ of the fuel cell 12 is commanded, oxidation gas supply and fuel gas supply are carried out so as to give an electrochemical reaction that generates an output voltage $V_{FC}$ on the characteristic line 60 corresponding to that output current $I_{FC}$. Conversely, when the command of S12 above is output, since supply of oxidation gas is restricted, characteristic line 62 results where for $I_{FC}$, $V_{FC}$ becomes a constant low voltage. Specifically, under a predetermined specified low voltage of the fuel cell 12 it is possible to change output current $I_{FC}$ of the fuel cell 12.

In this way, if the output voltage $V_{FC}$ of the fuel cell 12 is made a specified low voltage, the voltage converter 18 makes the output voltage of the secondary battery 14 a low voltage in response, to lower the inverter input voltage $V_{INV}$. For example, when the inverter input voltage $V_{INV}$ in the normal control voltage state where the rotating electrical machine 8 is not in a locked state is made about 400V, then when the rotating electrical machine 8 enters a locked state that inverter input voltage $V_{ONV}$ can be made about 30V.

FIG. 3 shows lowering of the flow rate of air, which is the oxidation gas, after time $t_1$, and lowering of inverter input voltage $V_{INV}$ in accordance with lowering of the flow rate. Change in the oxidation gas flow rate can be carried out using rotational speed of the ACP 42, so variation in the flow rate of air in FIG. 3 is also change in rotational speed of the ACP 42.

By lowering the inverter input voltage $V_{INV}$, it is possible to reduce power loss related to heating up of the switching elements of the inverter 20 in a locked state. This aspect is shown in FIG. 5. FIG. 5 has time on the horizontal axis, and shows voltage V between both ends of a switching element and current I flowing in the switching element. The state shown on the left side of FIG. 5 is when a switching element is ON, while the state shown on the right side is when the switching element is OFF. Power loss of an element is the product of the voltage V between both ends and the current I flowing, and can be made a small value by lowering the voltage V between both ends. The voltage between both ends of the switching element is related to the inverter input voltage $V_{INV}$, and if $V_{INV}$ is made small then the voltage between both ends of the switching element will also become small. Accordingly, by lowering $V_{INV}$, power loss of the switching elements of the inverter 20 in a locked state is reduced, and it is possible to limit heating of the switching elements.

In FIG. 3, from time $t_1$ to time $t_2$, output current $I_{FC}$ of the fuel cell 12 rises, and falls in response the current of the secondary battery 14, for the reason described in the following. Specifically, with the structure of FIG. 1, if operation of the fuel cell 12 is controlled to lower the output voltage $V_{FC}$ of the fuel cell 12, and thus lower the inverter input voltage $V_{INV}$, current is released by a capacitive component of the fuel cell 12 to compensate for lowering of the inverter input voltage $V_{INV}$. In this way, the output current $I_{FC}$ of the fuel cell 12 momentarily rises, and in response the current of the secondary battery 14 drops. This phenomenon is a temporary transient, and once a certain time elapses the normal state will be returned to. The effect of this capacitive component of the fuel cell 12 is also seen when returning $V_{INV}$ to the original normal operating voltage state. In FIG. 3, it is shown that this effect appears after time $t_3$ when the locked state of the rotating electrical machine 8 is released.

The effect due to the capacitive component of the fuel cell 12 is transitional, but regardless of that if it is determined that the rotating electrical machine 8 is in a locked state the inverter input voltage $V_{INV}$ is lowered and it is possible to reduce power loss in the switching elements of the inverter 20. In this manner, the inverter input voltage $V_{INV}$ is lowered by operational control of the fuel cell 12 when the rotating electrical machine 8 is in a locked state, and control is carried out to limit damage to the switching elements of the inverter 20.

Returning again to FIG. 2, while control to lower $V_{INV}$ is being carried out, whether or not the rotating electrical machine 8 has become released from the locked state is monitored (S14). This step is executed using a function of the locked state acquisition module 52 of the control section 50. Specifically, with the above-described example, whether or not the locked state is released is judged by referring to the torque command and the rotational speed of the rotating electrical machine 8. Then, when it is determined that the locked state has been released control of the fuel cell 12 returns to the normal control voltage state (S16). Specifically, control on the characteristic line 60 described in FIG. 4 is returned to.

With FIG. 3, at time $t_3$, since the rotational speed of the rotating electrical machine has risen, an aspect where the rotating electrical machine lock determination determines that the locked state has been released is shown. Then, after time $t_3$, the oxidation gas flow rate returns to a value corresponding to the torque command, the output current $I_{FC}$ of the fuel cell 12 also this becomes a corresponding value, and the inverter input voltage $V_{INV}$ is returned to a range of normal control voltage. As a result, the power supply controller 10 returns to the normal operating state, and travel of the vehicle is carried out.

Description has been described above with the fuel cell-side relay 16 in a connected state. For that reason, when the output voltage $V_{FC}$ of the fuel cell 12 is lowered to lower the inverter input voltage $V_{INV}$, the output current $I_{FC}$ of the fuel cell 12 rises temporarily due to the effect of the capacitive component of the fuel cell 12. This phenomenon is transitional, but the limiting of the extent of falling of $V_{INV}$ may be increased by the rated value of the voltage converter 18 and the rated value of the secondary battery 14 etc. A structure and method for limiting the effect of the capacitive component of the fuel cell 12 will now be described in the following. In the following the reference numerals of FIG. 1 to FIG. 5 will be used.

One method is to prevent the effect of the capacitive component of the fuel cell 12 to reach the inverter 20 side by disconnecting the fuel cell-side relay 16. Specifically, when the rotating electrical machine 8 moves from a state where it is not locked to a locked state, the fuel cell-side relay 16 is changed from a connected state to a disconnected state, and so released current due to the capacitive component of the fuel cell 12 does not occur even when the inverter input voltage $I_{INV}$ is lowered. In more detail, in the flowchart of FIG. 2, processing is provided, after S12, or depending on the situation after S10, to change the fuel cell-side relay 16 from a connected state to a disconnected state. This step is executed using a function of the relay state changing module 58 of the control section 50.

Figure 6:
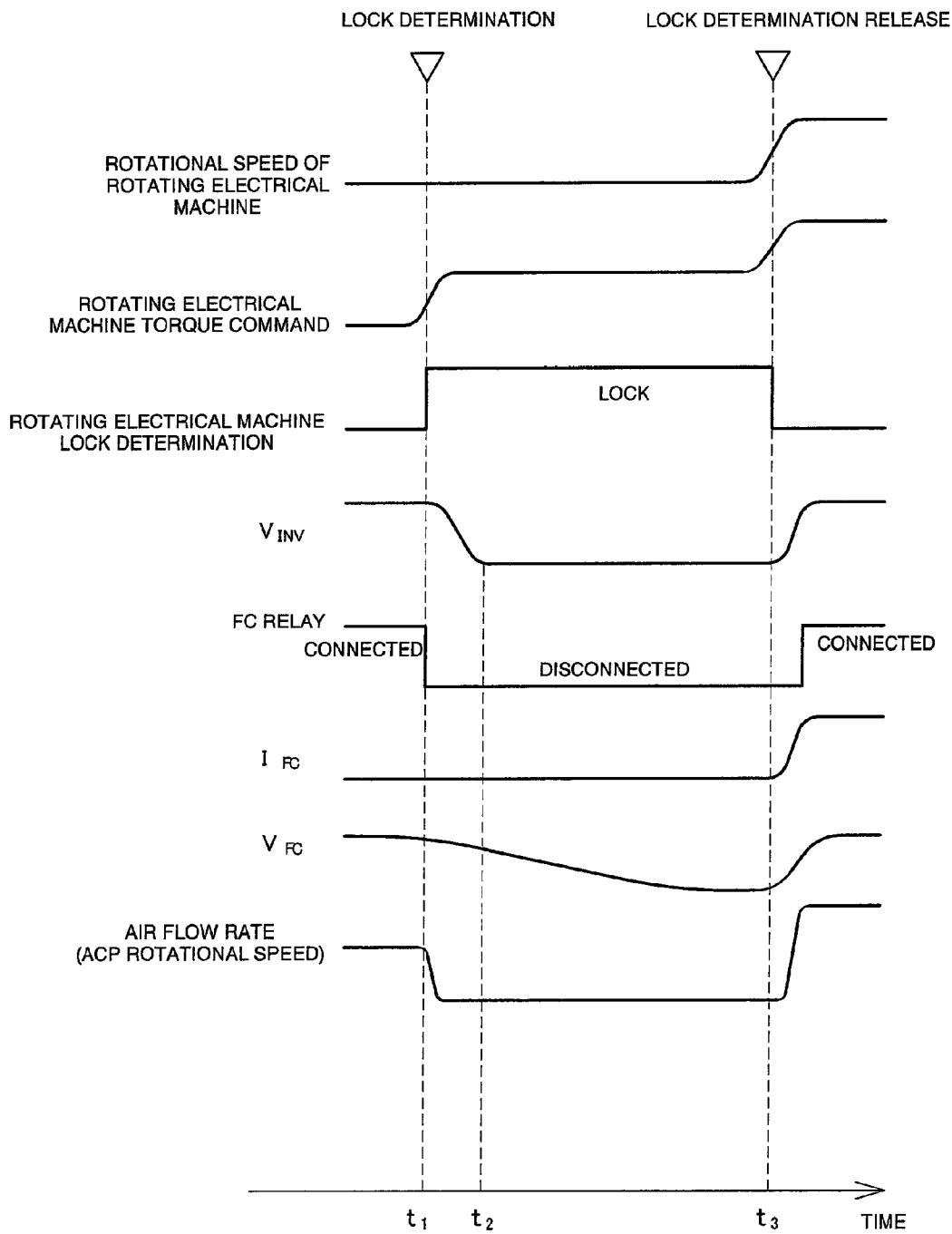
FIG. 6 is a timing chart showing another example of control in the embodiment of the present invention.

This aspect is shown in the timing chart of FIG. 6. The timing chart of FIG. 6 corresponds to FIG. 3, but shows state change of the fuel cell-side relay (FC relay) 16 at the fifth plot from the top, and also shows state change of output current $V_{FC}$ of the fuel cell 12 in the seventh plot from the top. Other items in FIG. 6 are the same as FIG. 3 and so detailed description will be omitted. FIG. 6 shows an aspect where when it is determined at time $t_1$ that the rotating electrical machine 8 is in a locked state, the flow rate of oxidation gas of the fuel cell 12 is restricted or stopped, and the fuel cell-side relay 16 is changed from a connected state to a disconnected state.

At this time, the output side of the fuel cell 12 has a connection to the inverter 20 etc. broken by the fuel cell-side relay 16, and so the output voltage $V_{FC}$ of the fuel cell 12 becomes an open circuit voltage: OCV, and since oxidation gas supply is restricted or stopped the output voltage gradually falls over time. Also, the voltage converter 18 carries out processing to lower the inverter input voltage $V_{INV}$ to a specified low voltage level in accordance with operation of the fuel cell 12 being on the characteristic line 62 described in FIG. 4. Here, since the fuel cell-side relay 16 is disconnected the effect of the capacitive component of the fuel cell 12 will not be felt at the inverter 20, even when $V_{INV}$ is lowered. Specifically, in FIG. 6, from time $t_1$ to time $t_2$, output current $I_{FC}$ of the fuel cell 12 does not rise.

In this way, when the rotating electrical machine 8 enters a locked state, operation control of the fuel cell 12 is carried out by changing the fuel cell-side relay 16 from a connected state to a disconnected state, and it is possible to prevent the effect of the capacitive component of the fuel cell 12, even when the inverter input voltage $V_{INV}$ is lowered. As a result, power loss in the switching elements of the inverter 20 when the rotating electrical machine 8 is in a locked state is reduced, and it is possible to limit damage to the switching elements.

At time $t_3$, when it is determined that the rotating electrical machine 8 is no longer in a locked state the fuel cell 12 returns to the normal supply state. As a result of this, the output voltage $V_{FC}$ of the fuel cell 12 starts to rise, and when that value reaches a predetermined specified open output voltage the fuel cell-side relay 16 is again returned to the connected state. Specifically, after S16 in FIG. 2 the fuel cell-side relay 16 returns from the disconnected state to the connected state. This step is executed using a function of the relay state changing module 58 of the control section 50. As a result, the power supply controller 10 again returns to the normal control state, and vehicle travel is carried out normally.

Another method for avoiding the effects of the capacitive component of the fuel cell 12 is to restrict or stop supply of oxidation gas in the fuel cell 12 when the rotating electrical machine 8 enters a locked state. This is temporarily stopping operation of the voltage converter 18. This method makes emission current due to the capacitive component of the fuel cell 12 absorb into concentrated electric current of the inverter 20 that is in the locked state. In the flowchart of FIG. 2, after S12 or depending on the situation after S10 a temporary stop of the operation of the voltage converter 18 is carried out. This function is executed using a function of the voltage converter control module 56 of the control section 50.

FIG. 7 shows this aspect. FIG. 7 corresponds to FIG. 6, and shows output voltage $V_{FC}$ of the fuel cell 12 on the fifth line from the top, and other items are the same as FIG. 3 and so detailed description will be omitted. Here, an aspect is shown where when it is determined at time $t_1$ that the rotating electrical machine 8 is in a locked state, the flow rate of oxidation gas of the fuel cell 12 is restricted or stopped, and operation of the voltage converter 18 is stopped (SDOWN).

At this time, flow rate of oxidation gas in the fuel cell 12 is restricted or stopped, and so the output voltage $V_{FC}$ of the fuel cell 12 progressively falls, and in accordance with this drop in output voltage the inverter input voltage $V_{INV}$ also drops. Accompanying the lowering of $V_{INV}$, the fuel cell 12 generates an emission current, and $I_{FC}$ rises, but this is absorbed by the total current of the inverter 20. In the meantime, $V_{FC}$ is gradually lowered, and when it falls to a specified low voltage, in this example when it falls to about 30V, the operation of the voltage converter 18 is restarted. Specifically, after S16 in FIG. 2, operation of the voltage converter 18 returns from a stopped state to an operating state. This step is executed using a function of the voltage converter control module 56 of the control section 50. As a result, the power supply controller 10 again returns to the normal control state, and vehicle travel is carried out normally.

What is claimed is:

1. A power supply controller comprising:
an inverter connected to a rotating electrical machine;
a fuel cell connected in parallel with a pair of power lines, the pair of power lines being a positive bus bar and a negative bus bar of the inverter;
a secondary battery connected in parallel with the pair of power lines;
a voltage converter connected in parallel with the pair of power lines, and arranged connected between the fuel cell and the secondary battery; and
relay members, provided in the pair of power lines at the output side of the fuel cell, for connecting or disconnecting between the fuel cell and the inverter, and between the fuel cell and the voltage converter, and
a control section which includes:
a locked state acquisition part that acquires whether or not the rotating electrical machine is in a locked state;
a fuel cell control part that, when the rotating electrical machine is in a locked state, changes the output voltage of the fuel cell so as to become a predetermined specified low voltage from a normal control voltage state when the rotating electrical machine is not in a locked state;
a voltage converter control part that, when the rotating electrical machine is in a locked state, changes using operation control of the voltage converter an inverter input voltage, which is a voltage across the pair of power lines, from a normal control voltage state when the rotating electrical machine is not in a locked state, to a specified low voltage state where the inverter input voltage is lowered to a predetermined low voltage; and
a relay state changing part that changes the relay members from a connected state to a disconnected state when the rotating electrical machine goes from a state where it is not locked to a locked state, so that emission current due to a capacitive component of the fuel cell is not generated, even when the inverter input voltage is lowered.

2. The power supply controller of claim 1, wherein the relay state changing part returns the relay members from a disconnected state to a connected state when the rotating electric machine returns from a state where it is locked to an unlocked state, and further the fuel cell returns to a normal supply state, and thus an open output voltage of the fuel cell becomes a predetermined specified open output voltage.

3. The power supply controller of claim 1, wherein
the rotating electrical machine is a rotating electrical machine for driving a vehicle, mounted in the vehicle.

4. A power supply controller comprising:
an inverter connected to a rotary electrical machine;
a fuel cell connected in parallel with a pair of power lines, the pair of power lines being a positive bus bar and a negative bus bar of an inverter;
a secondary battery connected in parallel with the pair of power lines;
a voltage converter connected in parallel with the pair of power lines, and arranged connected between the fuel cell and the secondary battery; and
a control section, wherein the control section includes:
a locked state acquisition part that acquires whether or not the rotating electrical machine is in a locked state;

a fuel cell control part that, with respect to supply of at least one of oxidation gas or fuel gas to the fuel cell, when the rotating electrical machine is in a locked state, changes from a normal supply state when the rotating electrical machine is not in a locked state to a limited supply state where supply amount is limited; and a voltage converter control part that, when the rotating electrical machine is in a locked state, stops operation of the voltage converter in a lowering period where output voltage of the fuel cell is lowered to a specified low voltage level by restricting supply of at least one of oxidation gas and fuel gas of the fuel cell, makes the inverter absorb emission current due to a capacitive component of the fuel cell that arises in accordance with lowering of the inverter input voltage in response to lowering of the output voltage of the fuel cell, and releases the stopping of the voltage converter once the lowering period has elapsed.

5. The power supply controller of claim 4, wherein the rotating electrical machine is a rotating electrical machine for driving a vehicle, mounted in the vehicle.

* * * * *